United States Patent [19]

Brodie et al.

[11] 4,075,047
[45] Feb. 21, 1978

[54] TIRE RETREADING SYSTEM

[75] Inventors: Edwin T. Brodie; Donaldee Brewer, both of Muscatine, Iowa

[73] Assignee: Bandag Incorporated, Muscatine, Iowa

[21] Appl. No.: 622,419

[22] Filed: Oct. 14, 1975

[51] Int. Cl.$^2$ .................. B29H 17/36; B29H 17/37
[52] U.S. Cl. .................. 156/96; 156/286; 156/289; 156/394
[58] Field of Search .................. 156/126–129, 156/96, 394 R, 394 FM, 87, 285–289, 381, 382; 29/290

[56] References Cited

U.S. PATENT DOCUMENTS

| | | | |
|---|---|---|---|
| 2,966,936 | 1/1961 | Schelkmann | 156/96 |
| 3,236,709 | 2/1966 | Carver | 156/96 |
| 3,325,326 | 6/1967 | Schelkmann | 156/96 |
| 3,743,564 | 7/1973 | Gross | 156/96 |
| 3,752,726 | 8/1973 | Barefoot | 156/96 |
| 3,769,121 | 10/1973 | Martin | 156/394 |
| 3,779,832 | 12/1973 | Reppel | 156/96 |
| 3,856,601 | 12/1974 | Schelkmann | 156/96 |
| 3,884,739 | 5/1975 | Hindin et al. | 156/96 |
| 3,933,551 | 1/1976 | Brodie et al. | 156/96 |

FOREIGN PATENT DOCUMENTS

| | | | |
|---|---|---|---|
| 1,319,975 | 0000 | United Kingdom | 156/96 |
| 746,375 | 3/1956 | United Kingdom | 156/96 |

OTHER PUBLICATIONS

Bandag, Incorporated Annual Report, 1970.

*Primary Examiner*—Charles E. Van Horn
*Assistant Examiner*—John E. Kittle
*Attorney, Agent, or Firm*—Cushman, Darby & Cushman

[57] ABSTRACT

Tire casings are retreaded with precured tread strips in a heated pressure vessel provided with pressure connections which effect simultaneous inflation of the tires and pressurization of the vessel while maintaining tire pressure above vessel pressure. Subsequently a pressure relief system permits the tires to exhaust faster than the vessel. Each tire is prepared for retreading by applying a bonding medium between the tire periphery and the retread strip and wrapping the resulting assembly with a fluid impervious flexible cover. Tread stabilization rings, wick material and non-stick polymer film may be inserted between the tread strip and the cover.

12 Claims, 6 Drawing Figures

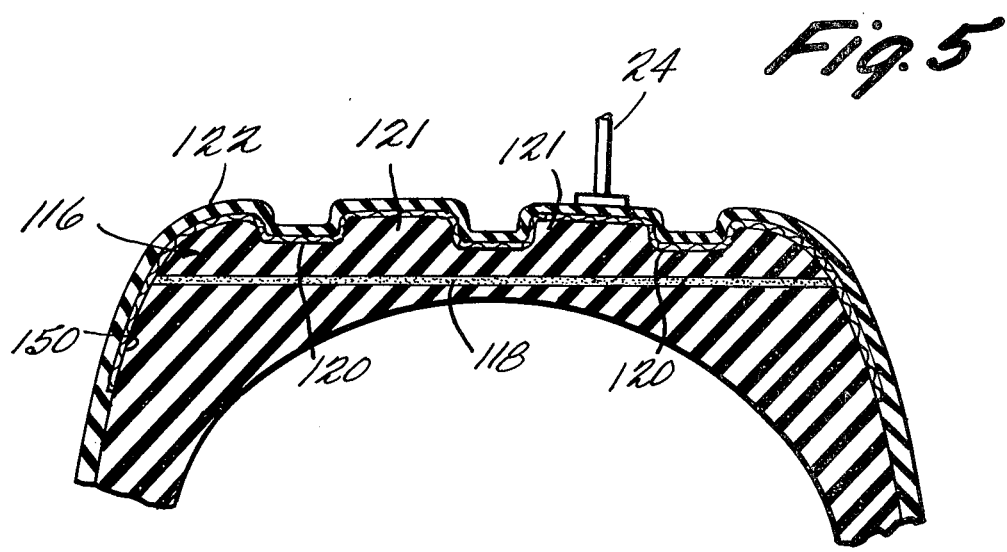
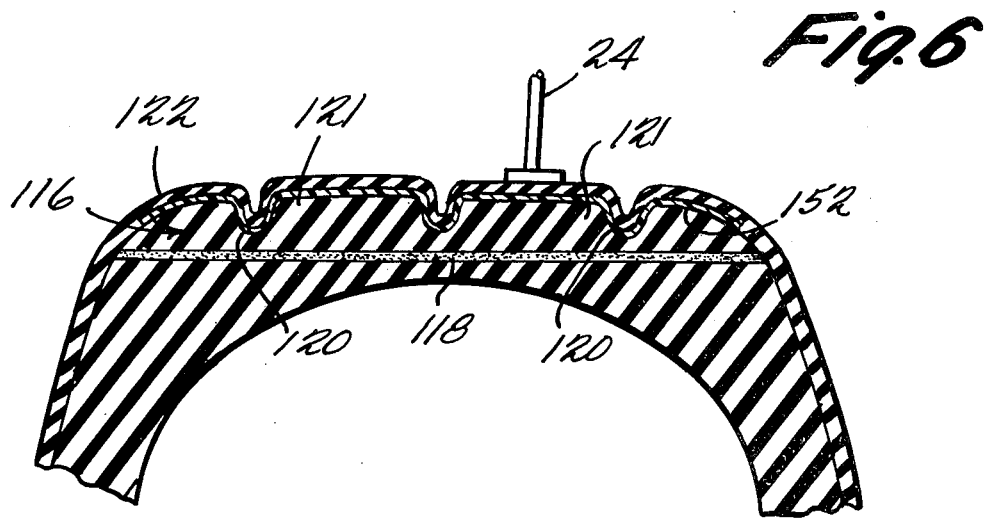

TIRE RETREADING SYSTEM

This invention relates to apparatus and methods for bonding precured rubber tread strips to tire casings.

In the known technique of bonding a precured rubber tread strip to a tire casing, the bonding operation is carried out by interposing a self-vulcanizing bonding material between the tire casing and the tread strip and by pressing the tire casing and tread strip together while applying sufficient heat to cause vulcanization of the bonding material. The pressing operation is generally carried out by means of a differential fluid pressure applied between the inside of the tire casing and the outside of the tread strip, and means are provided for venting air from between the cover and the strip. One difficulty which sometimes arises is that the bond between tire casing and tread strip is not uniformly strong at all points with the result that the bond may fail during subsequent use of the tire. Another difficulty which may arise is that the tread strip may become distorted or slightly displaced during the pressing and heating operation with the result that the vulcanized assembly is unsatisfactory. One cause of a poor bond is the presence of air between the tire casing and tread strip during vulcanization. Distortion or displacement of the tread strip generally results from non-uniformity of pressure during vulcanization. When the vulcanizing operation is carried out in a pressure chamber large enough to receive a plurality of tires, a further problem is that each tire may not receive the same heat and differential pressure treatment.

Distortion during vulcanization may also result from the inherent flexibility of the tread strip, and this problem is more likely to occur when the outer surface of the tread strip has been previously slitted with a large number of parallel slits for the purpose of increasing traction and wear life. The slitting operation itself may introduce a separate problem in that the slits form the tread ribs into a large number of tread lugs which may be torn away from the undertread portion during use of the tire, unless the slitting operation has been performed properly.

Removal of air if most readily effected by covering the tread strip and at least the adjacent side walls of the tire casing with a flexible impervious cover or envelope, sealing the cover to the tire and effecting a differential pressure between the interior and exterior of the cover as by applying fluid pressure to the exterior of the cover or applying a vacuum to the space between the cover and the assembly of tire casing and tread strip or a combination of both fluid pressure and vacuum applied sequentially or simultaneously. In either case the air is exhausted through a suitable conduit which is in communication at one end with the space. The pressing and vulcanizing operation may be carried out using the same fluid pressure differential technique or by means of mechanical pressure. Examples of different air expulsion and/or pressing operations are more fully described in U.S. Pat. Nos. 2,976,910 (Nowak), 3,236,709 (Carver), 3,325,326 (Schelkmann), 3,752,726 (Barefoot), and 3,745,084 (Schelkmann).

It has been recognized, for example, in the aforenoted U.S. Pat. Nos. 3,325,326 and 3,745,084 that the pressing together of the tread strip and tire casing may sometimes produce variations in the pressure being applied at different locations, with the result that the bonding medium and/or the tread are distorted or shifted during bonding. The resulting product may be unsatisfactory in having a nonuniform bond between tread and tire casing or in having other defects. The problem is thought to arise because pressure is exerted by whatever pressing element is used only on the outer surfaces of the tread profiles. In spite of the air removal operation some air may remain in the tread profiles with a resulting reduction in the pressure transmitted to those portions of the tread strip and those portions of bonding material lying directly below the circumferential tread grooves. The solution proposed by U.S. Pat. No. 3,325,326 is to first apply a vacuum inside the envelope and fluid pressure to the exterior of the envelope and then increase the pressure inside the envelope. The solution proposed by U.S. Pat. No. 3,745,084 is to assure that the envelope penetrates to the bottom of the grooves.

According to one important aspect of the present invention a special liner is inserted between the tread strip and the flexible cover. The liner in the form of a thin flexible perforated film of stretchable, non-stick material, provides lubrication between the cover and the tread strip, and due to its stretch properties it allows the liner and the cover to conform to the tread pattern during the pressing and bonding operation. This penetration of the liner and cover to the bottom of the tread grooves aids in exhausting all air from the space between the cover and the assembly of tire and tread strip because the air in the tread grooves passes outwardly through the perforations in the liner and is then exhausted through the conduit provided for this purpose. In addition penetration of the liner and cover into the tread pattern tends to stabilize the shape and position of the tread strip, thereby avoiding bond discontinuities which would result from deformation of the tread strip during bonding. The liner can be made of a variety of natural or synthetic materials such as natural or synthetic rubber, polyesters, or polyolefins such as polyethylene, polypropylene, polybutenes, polyisoprene and their copolymers. Polypropylene film has been found superior to films of rubber, polyethylene, mylar and other materials because even when it is perforated with many small holes it provides good lubrication without tearing or breaking during entry into the tread pattern and during subsequent removal. That is, it permits the cover to slip easily into the tread grooves without tending to hang up on and distort the tread when the pressing operation causes the cover to press against the tread. This in turn aids in obtaining uniform pressure on the tread strip. The film also retains its non-stick properties so that is can be removed as one-piece after the bonding operation. A particularly useful liner is polypropylene film of about 0.00125 inches thickness provided with spaced apart rows of 1/16 inch fine perforations or score marks. The rows may be spaced apart about 1 3/16 inches, and the fine perforations or score marks in each row may be spaced apart about 3/16 inch. The spacings may be less or more by about 25%. During use the stresses on the film cause the fine perforations or score marks to open up in a direction transverse to the rows so as to form larger perforations of perhaps 3/16 inch diameter.

According to another important aspect of the invention strips or pads of special stretchable wick material is placed between the flexible cover and the tire and tread assembly at the location of the air exhaust connection to aid in the release of entrapped air. The strips or pads of about 4 inches in width are placed transversely of the tire so as to extend from below the bond line on one side of the tire, over the tread strip to a location below the bond line on the other side of the tire. If necessary a similar strip may be placed circumferentially around the tread strip; this is often desirable if the tread strip is "slick", that is, having no tread grooves. The preferred wick material is a porous flexible fabric having stretch properties in two directions which are at a right angle to each other. The fabric is preferably woven fabric of 70 denier nylon filling yarn and 280 denier spandex warp yarn or equivalent structure having 160% stretch in the warp direction and 70% stretch in the width direction. The fabric may be 0.020 inches thick with a yarn count of about 20 warp yarns per inch and about 60 filling yarns per inch. A pad for use as described above may consist of 4 to 6 layers of the fabric treated with bag coat lubricant. The function of the pad cooperates with the function of the perforated polypropylene film, if the latter is present, to release entrapped air and to achieve equal curing pressure on the tread ribs. The pads must be of sufficient width to extend beyond the base dimensions of the exhaust valves on the envelope. The pads are particularly useful in retreading large tires such as are employed on heavy-duty earth moving vehicles (off-the-road vehicles); this type of tire does not have small tread grooves, and normally a perforated lubricating liner is not used in the retreading operation.

Another important aspect of the invention is the structure and operation of an improved pressure chamber which controls the application and removal of pressure and heat during the bonding operation. Heretofore the retreading of a plurality of tires simultaneously in a single pressure chamber relied on the manipulation of hand-operated valves to control differential pressure during inflation and deflation of the tires. This sometimes resulted in a wide variation in inflation rates for different tires in the pressure chamber and in slow reduction of the pressure differential after bonding. These procedures required considerable personnel time, and in addition the variables introduced into the bonding operation sometimes led to tread and tire distortions and poor air exhaustion. For example, if tire pressure was too low a poor bond might result along the center of the periphery of the tire. If insufficient air was removed a poor bond along the shoulder might result.

The present invention provides a pressure chamber which operates automatically to apply a uniform heat and pressure treatment to all tires in the chamber. In order to pressurize the chamber and simultaneously inflate the tires while maintaining inflation pressure higher than chamber pressure, the system provides a common fluid pressure manifold connected to each tire individually and to the chamber, together with a pressure differential check-valve and pressure-regulating devices arranged to assure that the tires are always pressurized to a higher pressure than the chamber. The chamber temperature is controlled and recorded automatically throughout the process. Upon completion of the bonding operation a timer and special exhaust valve arrangement permit the tires to exhaust more rapidly than the chamber pressure so that the chamber pressure causes partial collapse of the tires thereby rendering them loose on their rims. Alternatively a degree of tire pressure may be maintained so that the tires are still partially inflated when they are removed from the chamber. This is desirable when the tires are to be allowed to cure for an additional period of time, in an inflated condition while cooling.

According to another aspect of the present invention the problem of unequal pressure distribution in and on the tread strip and bonding medium is at least partially solved by inserting temporary pressure transmitting members, or support members into the circumferential tread grooves during the pressing and bonding operation. The support members are preferably in the form of elastic rings or endless ribs each of which engages the bottom and sides of its respective grooves so as to substantially fill the grooves. It has been found that the resilient material of the support members positively transmits the pressure of the pressing element to the bottom and sides of the groove to distribute the pressure evenly. This technique is very useful in retreading tires which have relatively narrow tread grooves, such as passenger car tires and airplane tires. It may also be useful at the tread splice area when retreading truck tires. The technique is generally unnecessary when the tread voids are sufficiently wide to permit the flexible cover to penetrate to the bottoms of the voids.

Specifically it has been found that the presence of the rings during pressing and bonding are very effective to transmit the radial pressure of the pressing element evenly to the tread and bonding medium, to avoid the formation of thick and thin areas of bonding medium to stabilize the tread strip against distortion of the tread ribs and the undertread portions under the grooves, and to prevent lateral displacement of the tread strip itself. A further advantage of the rings relates to the splice which is normally present between the two ends of the tread strip. The splice is usually made by placing bonding medium between the two ends of the tread strip as it is wrapped around the tire casing. During the pressing operation this bonding medium is compressed between the two ends of the tread strip, and when the envelope does not extend to the bottom of the tread groove some of this bonding medium may be forced radially outward into the groove where it cures and forms a dam which may completely fill the cross section of the groove at the location of the splice. The rings, in transmitting pressure to the splice area, prevents the formation of dams by forcing any displaced bonding medium against the bottom of the grooves so as to form thin layers.

The rings are particularly useful during bonding of tread strips which have been slit with a large number of closely spaced parallel cuts extending across the tread at an angle to the tread grooves. These slits or cuts penetrate radially into the tread ribs whereby each rib is divided into a large number of small separate tread elements which enhance the gripping power of the tread during road use. These tread elements, and consequently, the undertread portion of the tread strip are rather easily deflected or distorted during the pressing and bonding operation, but it has been found that the rings of this invention are very effective in supporting or stabilizing the elements. The slitting of tire treads to improve performance is, broadly, a well-known technique as disclosed, for example, in U.S. Pat. No. 3,683,728 (Meserve).

the rings may be inserted into the tread grooves prior to or after the conventional stitching operation. Stitching is the term applied to the step of applying a roller or rollers to the circumference of the assembly of tire casing, bonding medium and tread strip while rotating the assembly in order to provide initial adhesion of the tread strip to the tire casing prior to applying an envelope to the assembly. By inserting the rings prior to the stitching operation the rings become firmly seated in the tread grooves by the action of the stitching roller, inasmuch as the latter presses against the outer surface of the tread strip with sufficient force to temporarily deflect the tire casing radially inwardly.

The support members may be employed in any type of bonding operation involving the pressing of a tread strip against the tire casing by a flexible pressing element such as an envelope or by a solid pressing element such as smooth rigid mold members or a flexible metal band. The support members have particular advantage in the envelope type of operation, because it has been found that it is very seldom possible to force the envelope completely into the tread grooves due to the thickness of the envelope which is required for strength and durability. The envelope may penetrate part way into the grooves, and, therefore, the support members need not always completely fill the grooves. The members need only substantially fill the grooves and by this is meant that the envelope will tightly engage the outwardly facing surfaces of the members so that the pressure exerted by the envelope will be transmitted to the bottom of the grooves.

The preferred form of support members are resilient rubber rings capable of substantial elastic extension, each ring being formed from a length of rubber stock by stapling or splicing or otherwise securing the ends of the length together. Preferably the rings have circumstances less than the circumference of the tire and tread assembly so that they may be inserted into the tread grooves by stretching them over the circumference of the assembly and the allowing them to contract so as to fit snugly into the tread grooves, or at least to lie in the upper portion of the grooves so that they can then be pressed completely into the grooves. The flexibility of the rings is such that they follow the normal serpentine or zig-zag shape of the grooves.

The cross sectional shape of a ring may be circular or other shape, it being only necessary that the flexibility and resilience of the material of the ring being such that the ring generally conforms to the shape of the groove when pressure is applied to the outer surface of the ring. It is important, however, that the ring have a width dimension which will permit easy insertion of the ring into the groove and subsequently provide support for the tread profiles when pressure is being applied. In the relaxed condition the ring may have a width dimension of 80% – 100% of the groove width. The height dimension of the ring may be 50% – 100% of the groove depth. As an example, a 0.250 inch diameter ring is appropriate for a passenger tread having a groove width of 0.250 inch to 0.300 inch and a groove depth of 0.4375 inch.

The rings may be of solid or tubular cross section, and if tubular they may be inflatable so that upon introduction of fluid pressure thay expand into even tighter engagement with the sides and bottom of the tread grooves. The rings may also take the form of spaced apart ribs projecting from a common thin web which in the operative position of the rings will overlie the outermost surfaces of the tread ribs.

In the drawings

FIG. 5 is a view similar to FIG. 4 illustrating the use of a porous wick at the location of the air exhaust conduit;

FIG. 6 is a view similar to FIG. 4 illustrating the use of a perforated lubricating film between the tread and the cover.

Figure 1:
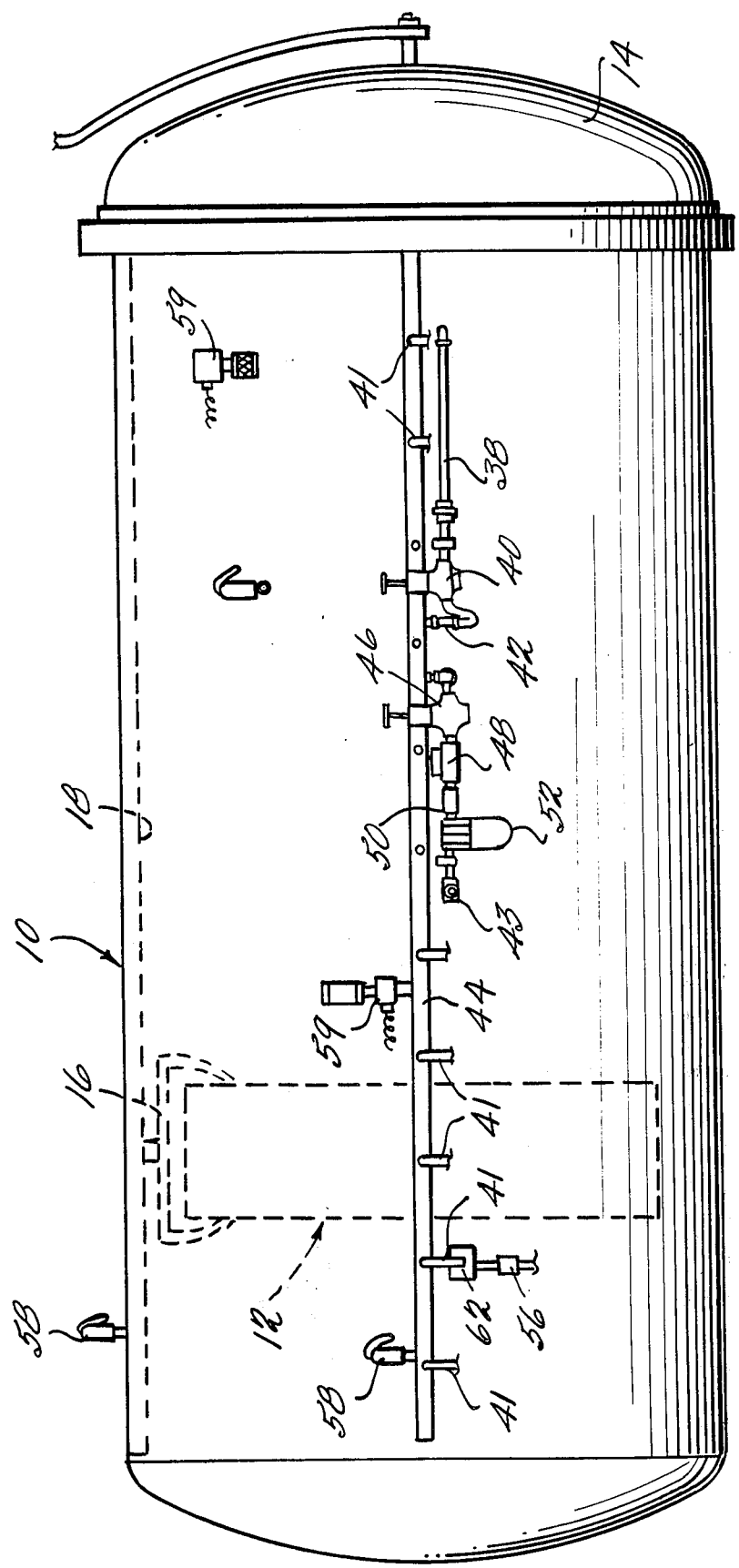
FIG. 1 is a schematic side view of a pressure chamber for carrying out a bonding operation on a plurality of tires.
Figure 2:
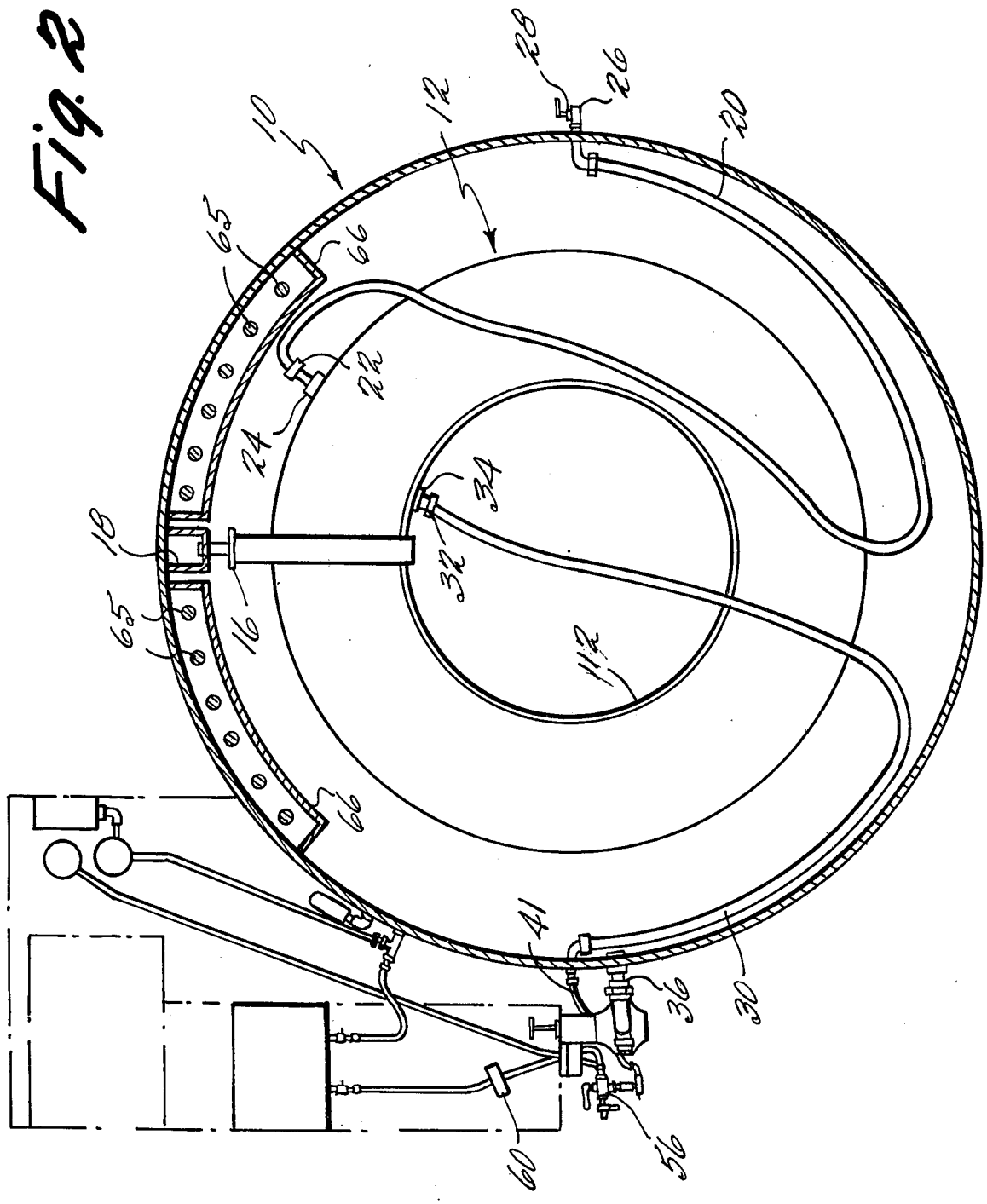
FIG. 2 is a schematic end view of the pressure chamber of FIG. 1.

FIGS. 1 and 2 illustrate a cylindrical pressure vessel 10 of sufficient size to receive a plurality of assemblies 12 of tire casings and tread strips. One end of the vessel 10 is provided with a door 14 so that each assembly 12 mounted on a rack 16, which is movable along a track 18, may be placed in and withdrawn from the vessel 10.

A typical assembly 12 is illustrated in FIG. 2. For each assembly 12 the pressure vessel 10 is provided with a flexible vent line 20 having an inner end 22 adapted to be releasably connected to a vent element 24 of the respective assembly 12. The outer end 26 of the vent line 20 communicates with the atmosphere by way of a shut-off valve 28. For inflating the tire of each assembly 12 the vessel 10 is provided with a flexible line 30 having an inner end 32 fitting adapted to be connected to the tire inflating element 34 of the respective assembly 12. The fitting 32 includes a check valve which prevents flow of pressure fluid from the line 30 when the line 30 is not connected to the assembly 12.

The system for supplying fluid pressure to the interior of the vessel 10 and for inflating the tire of each assembly 12 includes a manifold 44 which receives fluid pressure from an assembly provided with an inlet fitting 43 adapted to be connected to a pressure source such as compressed air. From the fitting 43 the fluid passes through a filter 52, a check valve 50, a solenoid valve 48 and a pressure regulator 46 into the manifold 44. Each of the several tire-inflation lines 30 is connected to the manifold 44 by a line 41 which includes a solenoid valve 62 and a manual shut-off valve 56. The assembly which transmits fluid from the manifold 44 and the interior of the vessel includes a differential check valve 42, a pressure regulator 40 and a pipe 38 connected to the vessel 10 by a fitting 36. With appropriate valving changes pressure fluids other than air can be used.

The manifold 44 and the vessel 10 are provided with pressure relief valve 58 and with solenoid-operated exhaust valves 59 which exhaust to atmosphere.

Resistance heating elements 65 are located within the vessel 10 for heating the interior of the vessel 10 to appropriate vulcanizing temperatures of 190° F to 212° F. The heating elements 65 are protected from damage by perforated metal grids 66.

Operation of the vessel 10 is as follows: Several tire assemblies 12 are moved through the door 14 into the vessel 10 by sliding the respective supporting rack 16 along the fixed track 18. The vent conduits 20 and the pressure conduits 30 are connected to the fittings 24 and 34, respectively. The valves 48 and 62 are open. Fluid under pressure, for example air at 110 psi (pounds per square inch), is then supplied to the fitting 43 so as to pressurize the manifold 44 and to begin inflating the tires and pressuring the vessel 10. The pressure in the vessel 10, and hence the pressure on the exterior of the assemblies 12, is maintained 15 to 20 psi less than the inflation pressure of the assemblies by means of the differential check valve 42. This valve 42 remains closed if the pressure differential across its valve seat is less than about 15-20 psi, and it opens if the differential is greater than about 15-20 psi. Thus, this valve opens and allows air to enter the vessel 10 after a preset pressure has been obtained in the manifold 44. If the pressure in the vessel 10 increases over the preset differential pressure, the valve 42 closes by spring pressure and the tire assemblies 12 continue to inflate until the differential pressure is again below that at which the valve 42 is set to open. The valve 42 then opens and again allows air to pass into the vessel 10.

At the same time the interior of the chamber 10 is heated to 190° F to 212° F by the electric resistance elements 65 which are automatically controlled by a thermostat (not shown).

This differential pressure is maintained throughout the bonding process by the pressure regulators 40 and 46. The pressure differential is necessary to maintain the correct tire configuration and to effect a seal of the cover 122 (FIGS. 3-6) to the tire 110. The greater pressure on the cover 122 forces all the air out from between the cover 122 and the tire 11 and this air flows to the atomsphere through the conduits 23 and 20. Simultaneously, the tread strip 116 is pressed against the tire 110 and the bonding medium 118 vulcanizes.

At the completion of the bonding operation a timer 60 is energized and allows the vessel 10 and the manifold 44 to exhaust. Each assembly 12 also exhausts through the conduit 30 and the respective valve 56 to the manifold 44. Due to the relative size of the exhaust ports the assemblies 12 become exhausted before the vessel 10. This allows the pressure in the vessel 10 to collapse the tire 110 of each assembly and to thereby aid in unseating the tire from its rim 112.

Alternatively, by providing a solenoid valve 62 the tires 110 may be re-inflated automatically at the end of the bonding process to a preset pressure and allowed to cool. Another alternative is to stop the exhausting of the tires at a preset pressure.

Yet another alternative is to reinflate the collapsed tires 110 outside the vessel 10 to a desired pressure and allow them to cool.

The reason for these alternatives is to provide inflation after bonding (post cure inflation) in order to reduce or eliminate shrinkage during the time the tire 110 is cooling. This is a particularly useful technique for passenger car tires and light truck tires.

Figure 3:
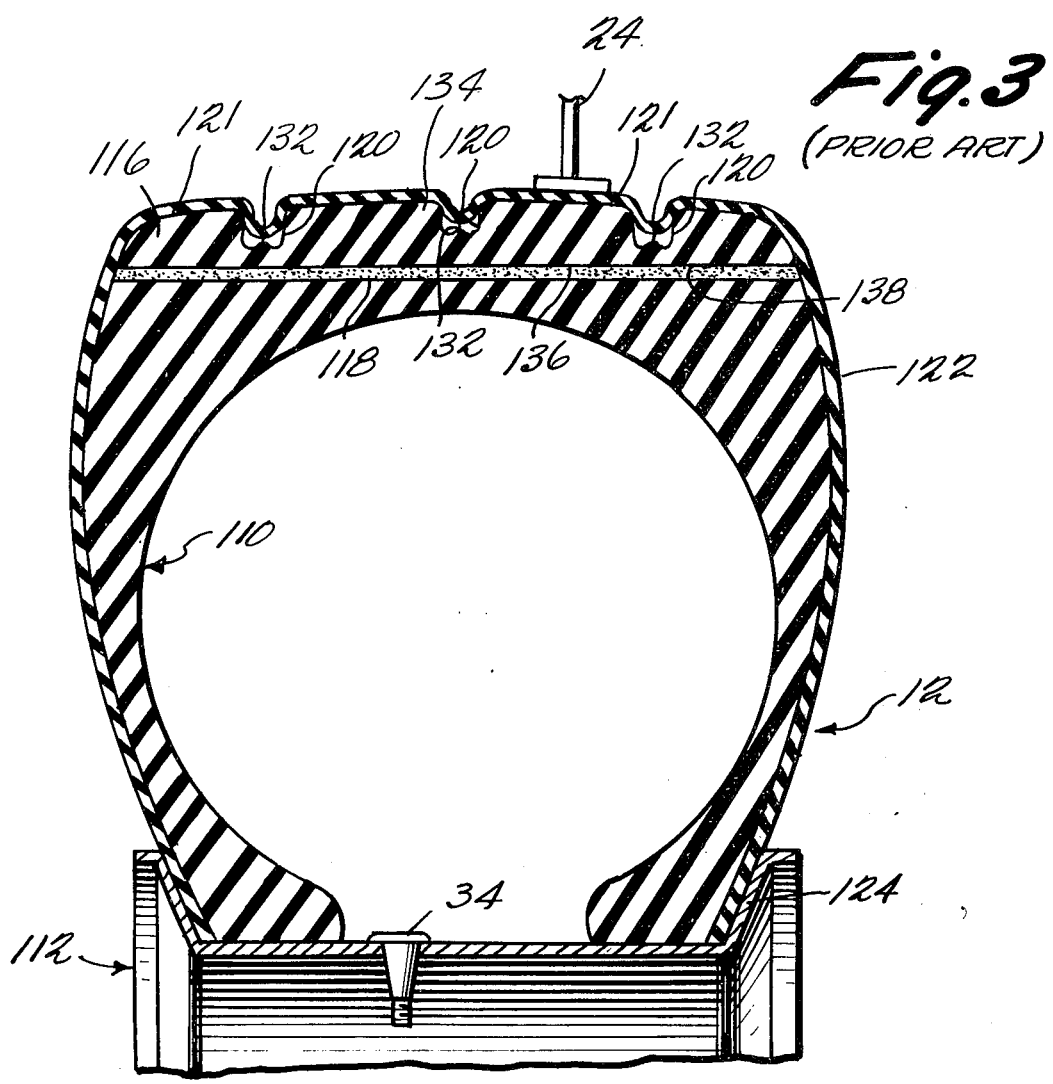
FIG. 3 is a schematic sectional view of a tire and tread assembly being bonded together by a prior art method and illustrating in exaggerated form some of the distortion problems which may arise.

FIG. 3 illustrates in schematic form a bonding operation being carried out by the technique disclosed in the aforenoted U.S. Pat. No. 3,236,709 and showing in exaggerated form some of the problems which can arise as a result of nonuniform distribution of pressure on the tread strip. There is shown a tire casing 110 mounted on a rim 112 so as to be inflatable with air or other fluid through a suitable valve 114. A prevulcanized tread strip 116 has been wrapped around the circumference of the tire casing 110 with a bonding medium 118 interposed between the two. The bonding medium 118 may be any suitable rubber base composition which is capable of self-vulcanization at elevated temperature and capable of forming a bond between a tread strip 116 and the tire casing 110. Preferably the bonding medium 118 is vulcanizable at temperatures between about 190° F. and 250° F. The tread strip 116 has been prevulcanized under high pressure and as shown includes conventional grooves 120 and ribs 121 each of which extends continuously around the circumference.

Overlying the tread strip 116 and the side walls of the tire casing 110 is a pressing element in the form of a flexible rubber annular envelope 122 which extends around the circumference of the tire and tread assembly. The edges of the envelope 122 are temporarily sealed to the side walls of the tire casing 110, as by being clamped at 124 between the side walls and the rim 112. The entire assembly of rim 112, tire casing 110, tread strip 116, bonding medium 118 and envelope 122 is disposed in a vessel 126 such as an autoclave. In order to press the tread strip 116 against the circumferential of the tire casing 110 and vulcanize the bonding medium 118, heated fluid such as a mixture of steam and air is injected into the vessel 126, a suitable connection 128 being provided in the wall of the vessel 126 for this purpose. Alternatively, the pressurizing fluid may be air and heat may be supplied by other means such as the resistance heating elements of FIG. 2. The pressure should be no greater than the inflating pressure in the tire casing so that the latter will not be deformed. The tire casing will always be inflated above the autoclave pressure.

The space between the inside surface of the envelope 122 and the assembly of tire and tread strip is in communication with the atmosphere outside the vessel 126 as by means of a conduit 130 connected to the envelope 122. The fluid pressure in the autoclave thereby presses the envelope 122 into tight contact with the assembly and forces the tread strip 116 against the circumference of the tire casing 110, the air in the envelope 122 being forced out through the conduit 130.

The thickness and flexibility of the envelope 122 and the width of the tread grooves 120 are such that normally the envelope 122 cannot penetrate to the bottom of the grooves, as shown in FIG. 3, even though this would be desirable. Instead, the envelope 122 will normally penetrate only part way into the grooves 120 with the results that air will be trapped in the grooves and that there is less force at the bottoms of the grooves 120 and less pressing of those portions of the tread strip 116 against the tire casing. This alone may produce a weaker bond under the grooves 120. At the same time, there is maximum force being applied on the outer surfaces of the tread ribs 121 without there being any support for the sides of the ribs 121. The overall result of this state of non-uniform pressure being exerted on the tread strip 116 is that several forms of distortion of the latter and of the bonding medium 118 may occur. One form of distortion is that the undertread portions of the tread strip may become humped, as shown at 132 in exaggerated form. Also, the individual tread ribs 121 may pitch or tilt as shown at 134. Further, the bonding medium 118 may become distorted into thick and thin portions 136 and 138 from movement of the individual ribs 121 or from lateral movement of the entire tread strip 116. Still further, as explained above but not shown in the drawing, bonding material from the spliced ends of the tread strip 116 may form a dam across one or more of the grooves 120.

Figure 4:
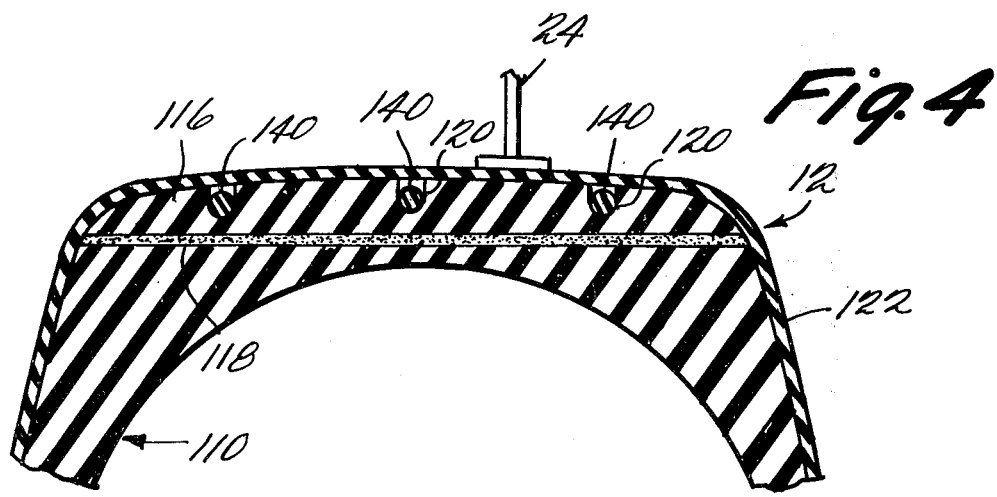
FIG. 4 is a schematic fragmentary view of a tire and tread assembly being bonded together using one embodiment of the method and apparatus of the present invention, in which support rings are provided in the tread grooves.

FIG. 4 illustrates how these defects are avoided by the presence of support or stabilizing members in the grooves 120 during the pressing and bonding operation. In the illustrated embodiment, the support members are resilient flexible elastic O-rings 140 which have been inserted into the grooves 120. The material of the rings 140 may be neoprene or other age resisting rubber having as original properties a tensile strength of at least 100 psi, 270° elongation and 60 $\neq$ 3 Shore A Durometer and having aged properties after 8 days at 230° F. of 70 psi tensile strength, 70% elongation and 72 $\neq$ Shore A Durometer. In a relaxed condition, the rings 140 should have a circumference of about 75% of the circumference of the assembly of tire casing and tread strip.

The rings 140 are inserted in the grooves 120 by stretching them over the circumference of the tire and tread assembly and pressing them into the grooves 120 prior to enclosing the assembly in the envelope 122. It is preferred that the insertion step be carried out simultaneously with stitching the tread strip 116 to the tire casing 110 because this assures that each ring 140 will be properly seated in the bottom of its groove before the envelope 122 is applied.

As shown in FIG. 4, each ring 140 should fit snugly in its groove 120 so as to be in contact with the bottom and at least a substantial portion of the side wall of the groove 120. The envelope 122 contacts the outer surface of the rings 140, so that autoclave pressure is transmitted to the undertread portions of the tread 116 directly below the grooves 120. At the same time, the tread ribs are supported against lateral distortion. The result is that all portions of tread strip are pressed against the circumference of tire casing 110 at essentially the same pressure, and there is no distortion of the bonding medium 118, the undertread, or the tread ribs 121.

FIG. 5 illustrates the use of a pad 150 of porous flexible wick material, as described previously, disposed between the cover 122 and the tread strip 116. In this embodiment the tread grooves 120 are rather wide. The pad 150 and the cover 122 penetrate to the bottoms of grooves 120 and therefore there is no need to provide supporting rings in the grooves 120.

FIG. 6 illustrates the use of a stretchable lubricating film 152 of perforated polypropylene between the cover 122 and the tread strip 116. The flexibility and lubricating properties of the film 152 permit the cover 122 to penetrate to the bottom of the grooves 120 to thereby pass out all air and achieve uniform pressure on the tread strip 116 without deformation of the latter. Without the presence of the film 152 the conditions illustrated in FIG. 3 may occur.

What is claimed is:

1. In a method of bonding a precured profiled tread strip to a tire casing by means of a self-vulcanizing bonding material interposed between the tire and the tread strip, said method comprising applying a flexible impermeable cover over the tread strip and tire assembly to form a sealed space between the cover and the assembly, exhausting air from the space and pressing the cover against the tread strip, the improvement comprising interposing between the tread strip and the cover a thin flexible perforated film of synthetic polymeric non-stick stretchable material having lubricating properties, said film thereby facilitating sliding of the flexible cover against the surface of the tread strip so as to aid in exhausting air from the space between the cover and the assembly.

2. A method as in claim 1 wherein said film is a perforated polypropylene film having a thickness of about 0.00125 inches.

3. A method as in claim 2 wherein the perforations in said film are score marks which during the pressing operation open up to form larger perforations.

4. A method as in claim 3 wherein said score marks are about 1/16 inch length and open up transversely to form larger perforations of about 3/16 inch diameter.

5. A method as in claim 1 wherein air is exhausted through an exhaust conduit connected to the cover, said method including the step of interposing between the tread strip and the cover, at the location of the connection between the exhaust conduit and the cover, a pad of porous fabric which is stretchable in two directions to thereby aid in releasing air from the space.

6. A method as in claim 5 wherein said fabric is woven from nylon yarns and spandex yarns.

7. In a method of bonding a precured profiled tread strip to a tire casing by means of a self-vulcanizing bonding material interposed between the tire and the tread strip, said method comprising applying a flexible impermeable cover over the tread strip and tire assembly to form a sealed space between the cover and the assembly, exhausting air from the space and pressing the cover against the tread strip, the improvement comprising interposing between the tread strip and the cover a thin flexible perforated film of synthetic polymeric stretchable material having non-stick and lubricating properties so that the cover can slide relative to the tread strip, the relationship of the thickness and flexibility of the film and the cover to the dimensions of the profiled tread strip being such that the film and cover closely conform to the profile of the tread strip without distorting said profile during the pressing operation so that exhaustion of air from between the cover and the assembly is facilitated.

8. A method as in claim 7 wherein said film is a perforated polypropylene film having a thickness of about 0.00125 inches.

9. A method as in claim 8 wherein the perforations in said film are score marks which during the pressing operation open up to form larger perforations.

10. A method as in claim 9 wherein said score marks are about 1/16 inch length and open up transversely to form larger perforations of about 3/16 inch diameter.

11. A method as in claim 7 wherein air is exhausted through an exhaust conduit connected to the cover, said method including the step of interposing between the tread strip and the cover, at the location of the connection between the exhaust conduit and the cover, a pad of porous fabric which is stretchable in two directions to thereby aid in releasing air from the space.

12. A method as in claim 11 wherein said fabric is woven from nylon yarns and spandex yarns.

* * * * *